(12) United States Patent
Khim et al.

(10) Patent No.: US 11,981,980 B2
(45) Date of Patent: May 14, 2024

(54) SULFUR-DOPED MICRO ZERO-VALENT METAL REDUCING AGENT AND METHOD FOR PREPARING THE SAME

(71) Applicant: KOREA UNIVERSITY RESEARCH AND BUSINESS FOUNDATION, Seoul (KR)

(72) Inventors: Jeehyeong Khim, Namyangju-si (KR); Mingcan Cui, Suwon-si (KR); Jongbok Choi, Seoul (KR); Yonghyun Lee, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 853 days.

(21) Appl. No.: 17/069,194

(22) Filed: Oct. 13, 2020

(65) Prior Publication Data
US 2021/0171372 A1    Jun. 10, 2021

(30) Foreign Application Priority Data
Dec. 10, 2019   (KR) .................. 10-2019-0163475

(51) Int. Cl.
*B22F 1/16*    (2022.01)
*B22F 9/04*    (2006.01)
(Continued)

(52) U.S. Cl.
CPC ............. *C22C 1/1084* (2013.01); *B22F 1/16* (2022.01); *B22F 9/04* (2013.01); *C02F 1/705* (2013.01);
(Continued)

(58) Field of Classification Search
CPC .. C22C 1/1084; B22F 1/16; B22F 9/04; B22F 2009/043; B22F 2301/30; C02F 1/705; C02F 2101/36
See application file for complete search history.

(56) References Cited

U.S. PATENT DOCUMENTS
2016/0052808 A1    2/2016  Huang

FOREIGN PATENT DOCUMENTS
KR   10-2010-0100538 A   9/2010
KR   10-1127544 B1       3/2012
(Continued)

OTHER PUBLICATIONS

Enhanced Reactivity and Electron Selectivity of Sulfidated Zerovalent Iron toward Chromate under Aerobic Conditions, Li et al., Environ. Sci. Technol. 2018, 52, 2988-2997.*
(Continued)

*Primary Examiner* — Haidung D Nguyen
(74) *Attorney, Agent, or Firm* — Hauptman Ham, LLP

(57) ABSTRACT

Disclosed is a sulfur-doped micro zero-valent metal reducing agent containing a zero-valent metal, wherein a metal sulfide layer synthesized using a ball milling process may be formed on a surface of the zero-valent metal. In addition, disclosed is a method for preparing a sulfur-doped micro zero-valent metal reducing agent including, in a ball milling process using a ball milling apparatus composed of a jar, balls, and a body, a first step of preparing an inorganic mixture by mixing a zero-valent metal and sulfur with each other, and a second step of forming a metal sulfide layer synthesized on a surface of the zero-valent metal by putting the inorganic mixture into the jar together with the balls and performing ball milling.

6 Claims, 4 Drawing Sheets

(51) Int. Cl.
*C02F 1/70* (2023.01)
*C22C 1/10* (2023.01)
*C02F 101/36* (2006.01)

(52) U.S. Cl.
CPC ..... *B22F 2009/043* (2013.01); *B22F 2301/30* (2013.01); *C02F 2101/36* (2013.01)

(56) References Cited

FOREIGN PATENT DOCUMENTS

| | | |
|---|---|---|
| KR | 10-1190285 B1 | 10/2012 |
| KR | 10-2014-0088964 A | 7/2014 |
| KR | 10-2016-0088501 A | 7/2016 |
| KR | 10-1717127 B1 | 3/2017 |
| KR | 10-1814871 B1 | 1/2018 |
| KR | 10-2018-0080620 A | 7/2018 |
| KR | 10-1925751 B1 | 12/2018 |

OTHER PUBLICATIONS

Reductive debromination of decabromodiphenyl ether by iron sulfide-coated nanoscale zerovalent iron: mechanistic insights from Fe(II) dissolution and solvent kinetic isotope effects*, X. Wei et al. / Environmental Pollution 253 (2019) 161-170.*
Yawei Gu et al, Mechanochemically Sulfidated Microscale Zero Valent Iron: Pathways, Kinetics, Mechanism, and Efficiency of Trichloroethylene Dechlorination, Environmental Science & Technology, Oct. 6, 2017, pp. 12653-12662.

* cited by examiner

SULFUR-DOPED MICRO ZERO-VALENT METAL REDUCING AGENT AND METHOD FOR PREPARING THE SAME

CROSS-REFERENCE TO RELATED APPLICATIONS

A claim for priority under 35 U.S.C. § 119 is made to Korean Patent Application No. 10-2019-0163475 filed on Dec. 10, 2019, in the Korean Intellectual Property Office, the entire contents of which are hereby incorporated by reference.

BACKGROUND

Embodiments of the inventive concept described herein relate to a sulfur-doped micro zero-valent metal reducing agent and a method for preparing the same.

Today, most countries on the planet face serious environmental problems such as waste and wastewater disposal, air pollution, soil and groundwater pollution, and the like along with a difficulty of securing drinking water.

Recently, introduction of a nanotechnology has become a major turning point in a development of a pollutant disposal technology. Since then, research on soil-groundwater restoration using a nanomaterial has been steadily progressing.

Representatively, advanced countries such as the United States, Europe, and the like have been researching a technology of reducing an organic pollutant such as PCE, TCE, and the like found in contaminated soil and groundwater using nano zero-valent iron (nZVI).

However, the nano zero-valent iron as described above has a following problem.

The above-described nano zero-valent iron has strong reducing power, is non-toxic, and has a high economic efficiency, so that the nano zero-valent iron has a very high potential to be actually applied in the field. However, in the actual field application, oxide is formed on a surface of the nano zero-valent iron, so that a reduction rate is very low compared to an input amount.

Accordingly, platinum, ruthenium, gold, and palladium are attached to the surface of the nano zero-valent iron to increase a reactivity and a processing speed for the pollutant and to prevent the formation of the oxide. Alternatively, a surface property of the nano zero-valent iron is modified using oil, surfactant, or the like and the nano zero-valent iron is used in the field as an emulsion.

However, the nano zero-valent iron to which the metal is attached has an economic limitation because a very expensive catalyst material such as the platinum, the ruthenium, the gold, and the palladium must be used. In a case of the surfactant, there is a problem that additives used in the modification process worsen environmental pollution.

Accordingly, research on a zero-valent metal, which may be widely used in various industries and the like as a powerful and inexpensive reducing agent as itself continues.

SUMMARY

Embodiments of the inventive concept provide a sulfur-doped micro zero-valent metal reducing agent and a method for preparing the same that may prevent oxide formation on a surface of a zero-valent metal and improve a reduction efficiency through ball milling.

According to an exemplary embodiment, a sulfur-doped micro zero-valent metal reducing agent contains a zero-valent metal, and a metal sulfide layer synthesized using a ball milling process is formed on a surface of the zero-valent metal.

In addition, the zero-valent metal includes zero-valent zinc, and the metal sulfide layer includes zinc sulfide.

In addition, the metal sulfide layer may be synthesized by a mechanochemical bonding reaction, and the zero-valent metal in a solid phase and sulfur in the solid phase react to form a new solid phase in the mechanochemical bonding reaction.

According to an exemplary embodiment, a method for preparing a sulfur-doped micro zero-valent metal reducing agent includes, in a ball milling process using a ball milling apparatus composed of a jar, balls, and a body, a first step of preparing an inorganic mixture by mixing a zero-valent metal and sulfur with each other, and a second step of forming a metal sulfide layer synthesized on a surface of the zero-valent metal by putting the inorganic mixture into the jar together with the balls and performing the ball milling.

In addition, the first step may include mixing the micro zero-valent metal with the sulfur in a weight ratio of 1:0.2 to 1.

In addition, the second step may include performing the ball milling process for 2 to 4 hours at a rotation speed of 300 to 500 rpm.

In addition, the second step may include mixing the balls with the inorganic mixture in a weight ratio of 1:5 to 15 in the ball milling process.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
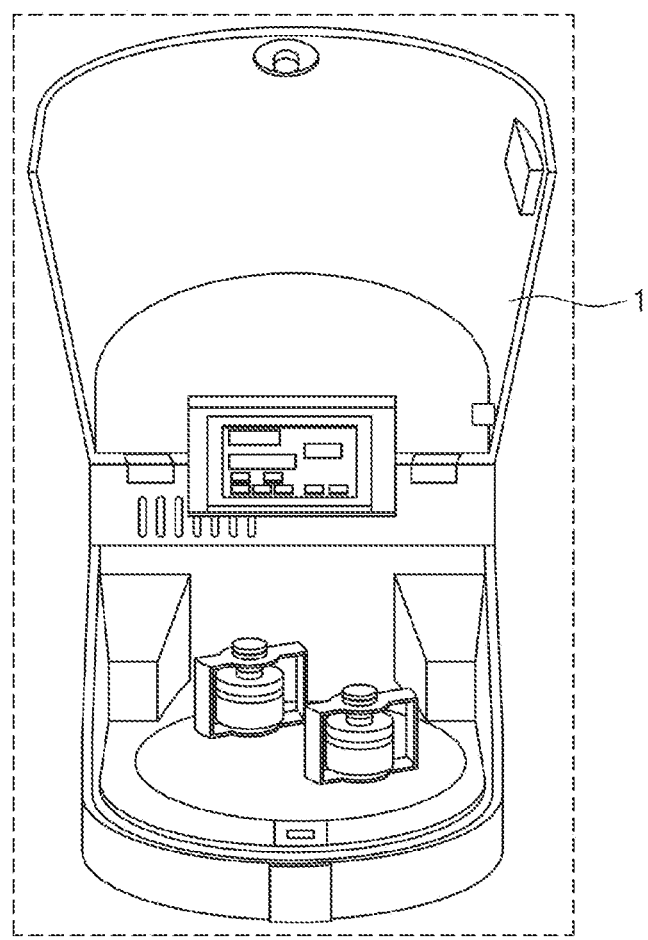
FIG. 1 is a diagram schematically showing a ball milling apparatus for preparing a sulfur-doped micro zero-valent metal reducing agent according to an embodiment of the inventive concept.

Hereinafter, an embodiment of the inventive concept will be described in more detail with reference to the accompanying drawings. Embodiments of the inventive concept may be modified in various forms, and a scope of the inventive concept should not be construed as being limited to following embodiments. This embodiment is provided to more completely explain the inventive concept to those of ordinary skill in the art. Therefore, a shape of each of elements in the drawings is exaggerated to emphasize more clear description.

The configuration of the invention for clarifying the solution to the problem to be solved by the inventive concept will be described in detail with reference to the accompanying drawings based on a preferred embodiment of the inventive concept. In assigning reference numerals to components of the drawings, the same reference numerals are assigned to the same components even when they are on different drawings. Further, it should be noted in advance that components of other drawings may be cited when necessary when describing the drawing.

Figure 2:
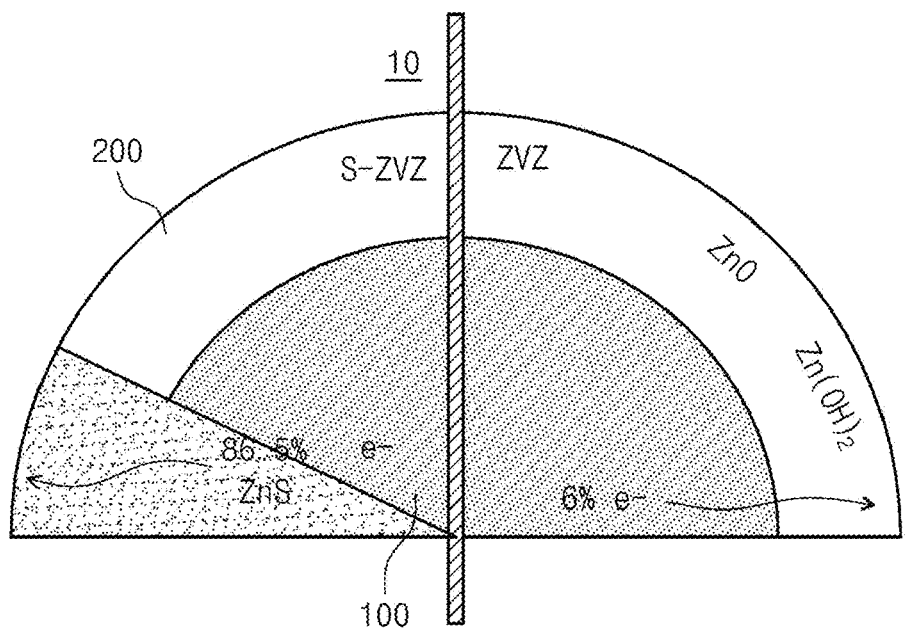
FIG. 2 is a diagram for describing a schematic structure of a sulfur-doped micro zero-valent metal reducing agent according to an embodiment of the inventive concept.

FIG. 1 is a diagram schematically showing a ball milling apparatus for preparing a sulfur-doped micro zero-valent metal reducing agent according to an embodiment of the inventive concept. In addition, FIG. 2 is a diagram for describing a schematic structure of a sulfur-doped micro zero-valent metal reducing agent according to an embodiment of the inventive concept.

Hereinafter, a sulfur-doped micro zero-valent metal reducing agent 10 and a method S10 for preparing a sulfur-doped micro zero-valent metal reducing agent according to an embodiment of the inventive concept utilize ball milling.

Specifically, referring to FIG. 1, in the inventive concept, a method for applying energy using a ball milling apparatus 1 uses mechanochemical energy generated by adjusting a rotation speed and a rotation time during the ball milling. The energy is applied to a material by friction between a ball and the material, between the material and the material, and between the material and a jar.

In general, when the rotation speed and the rotation time are above a certain range during the ball milling, compressive stress energy applied to the material to be ball milled provides not only simple mixing but also high reaction energy that may induce a reaction of the material. Therefore, a phase of the material to be ball milled may be changed.

Specifically, the ball milling process is a preparing method using a mechanochemical reaction. In the ball milling process, bonding and crushing of material particles occur repeatedly. As a size of the material decreases, processes of generation, contact, separation, and regeneration of a new surface or a new interface occur continuously and simultaneously, and a direct contact area between reactants increases. Thus, a solid phase/a solid phase reaction may occur even near a room temperature. That is, even in the solid phase reaction that generally requires a high temperature, the reaction may occur relatively easily without supplying heat from the outside.

In addition, materials of the jar and the ball generally used may be selected from a metal and a ceramic based on the material and required milling energy. Frictional heat may be generated during a mechanical activation process between the jar, the ball, and the material. Further, the frictional heat may contribute to promoting material diffusion in the solid phase/the solid phase reaction.

As shown in FIG. 2, a sulfur-doped micro zero-valent metal reducing agent (S-mZVM) according to an embodiment of the inventive concept may be composed of a micro zero-valent metal (mZVM) and a metal sulfide (MS) layer formed on a surface of the micro zero-valent metal (mZVM).

Specifically, the sulfur-doped micro zero-valent metal reducing agent 10 contains a zero-valent metal 100, and a metal sulfide layer 200 synthesized using the ball milling process is formed on a surface of the zero-valent metal 100.

The zero-valent metal 100 is a material that may efficiently process non-biodegradable pollutant. Metals that may be used as the zero-valent metal 100 include nickel (Ni), zinc (Zn), and iron (Fe), but may not be limited to the materials listed above, and any metal may be used based on a given environment.

The zero-valent metal 100 according to an embodiment of the inventive concept is preferably micro zero-valent zinc (mZVZ), and a size thereof is 20 to 50 μm.

The metal sulfide layer 200 is a compound formed by combining the metal and sulfur (S) with each other, and may include nickel sulfide (NiS), zinc sulfide (ZnS), tin sulfide (SnS), iron sulfide (FeS), and the like.

Such metal sulfide layer 200 may prevent formation of hydroxide metal and metal oxide on the surface of the zero-valent metal 100, and function as an electron path through which electrons of the zero-valent metal 100 move, thereby promoting transfer of electrons generated by oxidation of the metal.

In addition, the metal sulfide layer 200 has high electrical conductivity characteristics, so that as electron transfer to pollutant adsorbed on the metal sulfide layer 200 becomes easy, a reduction process of the pollutant, which is a reaction that occurs by receiving the electrons at the surface of the metal, may be promoted.

The metal sulfide layer 200 according to an embodiment of the inventive concept is preferably the zinc sulfide (ZnS), but is not limited thereto as long as the metal sulfide layer 200 prevents the formation of the oxide on the surface of the zero-valent metal 100 and facilitates the electron transfer.

In addition, referring to FIG. 2, based on a middle straight line, a left figure shows the sulfur-doped micro zero-valent metal reducing agent 10 of the inventive concept, and a right figure shows a conventional zero-valent metal reducing agent with an oxide layer formed thereon.

In addition, in the left figure, the sulfur-doped micro zero-valent metal reducing agent 10 of the inventive concept is a sulfur-doped micro zero-valent zinc reducing agent (S-ZVZ) in which the micro zero-valent zinc is used as the zero-valent metal 100. Further, the metal sulfide layer 200 containing the zinc sulfide is formed on a surface of the micro zero-valent zinc. Further, in the right figure, the conventional zero-valent metal reducing agent is a zero-valent zinc reducing agent in which zero-valent zinc is used as the zero-valent metal 100. However, a zinc oxide layer is formed on a surface of the zero-valent zinc.

Accordingly, in the sulfur-doped micro zero-valent metal reducing agent 10 of the inventive concept, the metal sulfide layer 200 is made of the zinc sulfide (ZnS), so that the sulfur-doped micro zero-valent metal reducing agent 10 may have an electron transfer rate of 86.5% that is higher than an electron transfer rate of 6% of the conventional zero-valent zinc reducing agent.

A principle of formation of the sulfur-doped micro zero-valent metal reducing agent 10 according to an embodiment of the inventive concept will be described below.

Referring to FIGS. 1 to 2, the metal sulfide layer 200 may be synthesized by a mechanochemical bonding reaction of the zero-valent metal 100 and the sulfur through the ball milling process.

Specifically, a substitution reaction such as oxidation/reduction reactions, a bonding reaction between the metal and a non-metal or a semi-metal elements, a complex reaction in which two or more phases form a complex phase, and the like may be mechanically activated even at a low temperature near the room temperature when using the ball milling process.

That is, the metal sulfide layer 200 of the inventive concept may be formed by a mechanochemical bonding reaction in which the zero-valent metal 100 in the solid phase and the sulfur in the solid phase react to form a new solid phase. The mechanochemical bonding reaction may be performed at a temperature between 120 and 140° C. because of frictional heat generated during the ball milling process.

Specifically, during the ball milling process, the metal sulfide layer 200 is crystallized and synthesized on the surface of the zero-valent metal 100 while bonding and crushing processes of particles of the zero-valent metal 100 and the sulfur occur repeatedly, and at the same time, processes of generation, contact, separation, and regeneration of a new surface or a new interface occur continuously as a size of the particle decreases.

In addition, in the ball milling process, an increase in a defect density inside the particles of the zero-valent metal 100 may serve to accelerate diffusion of the sulfur.

For example, in the inventive concept, when the micro zero-valent zinc is used as the zero-valent metal 100 in the solid phase, the micro zero-valent zinc and the sulfur react to form the zinc sulfide being the new solid phase through the mechanochemical bonding reaction. The mechanochemical bonding reaction may be performed at the temperature between 120 and 140° C. because of the frictional heat generated during the ball milling process.

Hereinafter, the inventive concept will be described in detail through an embodiment. However, the following embodiment is only to illustrate the inventive concept, and the inventive concept is not limited by the following embodiment.

Figure 3:
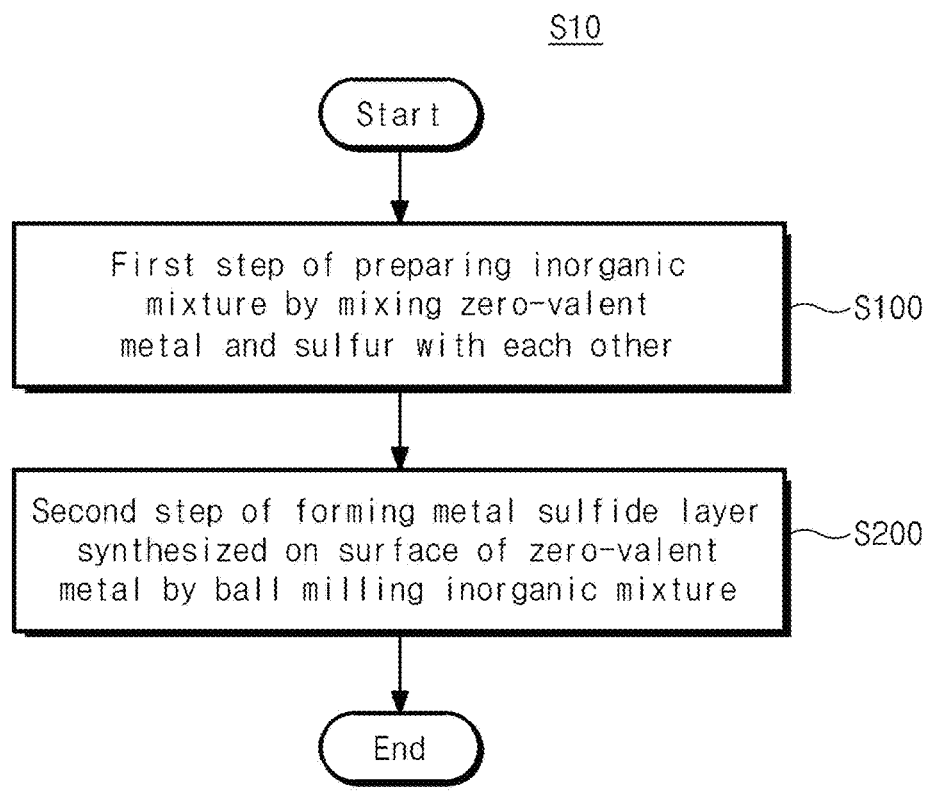
FIG. 3 is a flowchart showing a method for preparing a sulfur-doped micro zero-valent metal reducing agent according to an embodiment of the inventive concept.

FIG. 3 is a flowchart showing a method for preparing a sulfur-doped micro zero-valent metal reducing agent according to an embodiment of the inventive concept.

Referring to FIG. 3, the method S10 for preparing the sulfur-doped micro zero-valent metal reducing agent according to an embodiment of the inventive concept may include, in the ball milling process using the ball milling apparatus 1 composed of a ball milling jar, balls for the milling, and a body, a first step S100 of preparing an inorganic mixture by simply mixing the zero-valent metal and the sulfur with each other, and a second step S200 of forming the metal sulfide layer synthesized on the surface of the zero-valent metal by putting the inorganic mixture into the ball milling jar together with the balls for the milling and performing the ball milling.

The first step S100 is a preparation process of a material of powder of the zero-valent metal 100 and powder of the sulfur to perform the ball milling process. According to an embodiment to be described below, the powder of the zero-valent metal 100 and the powder of the sulfur are mixed with each other in a following weight ratio.

In addition, the powder of the zero-valent metal 100 may contain one material selected from a group consisting of zero-valent nickel ($Ni^0$), zero-valent zinc) ($Zn^0$), and zero-valent iron ($Fe^0$).

In addition, the powder of the zero-valent metal 100 according to an embodiment of the inventive concept preferably contains the zinc ($Zn^0$). Specifically, the powder of the zero-valent metal 100 may be the micro zero-valent zinc (mZVZ).

In addition, an average particle size of the powder of the zero-valent metal 100 may be 20 to 50 μm.

In addition, the average particle size of the powder of the sulfur used in the first step S100 is preferably 10 to 90 μm. Further, the powder of the sulfur may be mixed with the powder of the zero-valent metal 100.

Specifically, the powder of the zero-valent metal 100 and the powder of the sulfur may be mixed with each other in a weight ratio of 1:0.2 to 1 in a vial jar to prepare the inorganic mixture. Thereafter, in the second step S200, the inorganic mixture is inserted into the ball milling jar for the ball milling process.

More specifically, the inorganic mixture is inserted into the ball milling jar together with the balls for the milling. As the ball for the milling, a stainless steel ball, a nickel ball, a zinc ball, an alumina ball, or a zirconia ball may be used, but the ball for the milling may not be limited thereto.

In the method S10 for preparing the sulfur-doped micro zero-valent metal reducing agent according to an embodiment of the inventive concept, it is preferable to use the zirconia ball as the ball for the milling. Accordingly, impurities that may be introduced from the ball for the milling may be prevented.

In addition, the ball milling process may be performed under one of dry and wet schemes. Argon gas is used as a medium in the dry scheme, and ethanol is used as the medium in the wet scheme.

In the second step S200, the inorganic mixture prepared in the first step S100 is mixed with the balls for the milling and inserted into the ball milling jar to perform the ball milling process. The inorganic mixture and the balls for the milling may be mixed with each other in a weight ratio of 5 to 15:1.

In this connection, the ball milling process may be performed under a dry medium, and the dry medium may exert an effect of preventing oxidation of the powder of the zero-valent metal 100 when performing the ball milling process. For example, the dry medium may be the argon gas.

In addition, the ball milling process in the second step S200 may be performed for 2 to 4 hours at a rotation speed of 300 to 500 rpm.

In the ball milling process, when the rotation speed is less than 300 rpm or a ball milling time is less than 2 hours, low energy is applied. This only induces simple mixing of the materials, but is not able to induce a chemical reaction such as the crystallization of the metal sulfide layer 200. Specifically, an interior of the ball milling jar is not able to reach the temperature between 120 and 140° C., which is the temperature capable of inducing the formation of the metal sulfide layer 200.

In addition, too high energy is applied when the rotation speed exceeds 500 rpm or the ball milling time exceeds 4 hours. Accordingly, the temperature of the interior of the ball milling jar may exceed 150° C., and crystallinity of the metal sulfide layer 200 may be reduced because of the high mechanical energy, thereby inducing amorphization.

The method S10 for preparing the sulfur-doped micro zero-valent metal reducing agent according to an embodiment of the inventive concept uses the mechanical energy generated by adjusting the rotation speed and the rotation time of a ball mill during the ball milling. The energy is applied to a sample by friction between the ball and the sample, the sample and the sample, and the sample and the jar. One selected from a group consisting of an attritor, a 3-D mixer, a planetary ball mill, a vibratory ball mill, and a horizontal ball mill may be used as the ball milling apparatus, but the ball milling apparatus may not be limited thereto.

Example 1: Preparation of the Sulfur-Doped Micro Zero-Valent Zinc Reducing Agent S100: First, an inorganic mixture was prepared by mixing 10 g of powder of the micro zero-valent zinc (mZVZ) having an average particle size of 200 and 2 to 10 g of the powder of the sulfur (S) having an average particle size of 50 μm with each other in the vial jar.

In addition, a total of four inorganic mixtures (a first inorganic mixture, a second inorganic mixture, a third inorganic mixture, and a fourth inorganic mixture) were prepared by mixing the powder of the micro zero-valent zinc and the powder of the sulfur in weight ratios of 1:0.2, 1:0.5, 1:0.8, and 1:1.

S200: 12 g, 15 g, 18 g, and 20 g of the respective first to fourth inorganic mixtures were prepared, and each of the first to fourth inorganic mixtures are put into each of four ball milling jars together with 30 g of the zirconia balls having a diameter of 6 mm. Thereafter, the ball milling is performed for 4 hours at a rotation speed of 500 rpm to prepare the sulfur-doped micro zero-valent zinc reducing agent (S-mZVZ) in which the zinc sulfide (ZnS) layer is formed on the micro zero-valent zinc (mZVZ) in the solid phase as shown in FIG. 2.

In this connection, the ball milling process was performed as the dry process, and the argon gas was used as the dry medium.

In this connection, as the sulfur-doped micro zero-valent zinc reducing agent, a total of 4 samples (sample X1 to X4) were prepared. A sample X1 is a micro zero-valent zinc reducing agent with a weight ratio of 1:0.2 of the micro zero-valent zinc powder and the sulfur powder. A sample X2 is a micro zero-valent zinc reducing agent with a weight ratio of 1:0.5 of the micro zero-valent zinc powder and the sulfur powder. A sample X3 is a micro zero-valent zinc reducing agent with a weight ratio of 1:0.8 of the micro zero-valent zinc powder and the sulfur powder. In addition, a sample X4 is a micro zero-valent zinc reducing agent with a weight ratio of 1:1 of the micro zero-valent zinc powder and the sulfur powder.

Comparative Example 1: Preparation of the Micro Zero-Valent Zinc Reducing Agent

Except for mixing the micro zero-valent zinc powder and the sulfur powder with each other in a weight ratio of 0.2:1 in S100 of Example 1, the sulfur-doped micro zero-valent zinc reducing agent was prepared in the same manner as Example 1.

Experimental Example 1: Measurement of a X-Ray Diffraction Pattern

To evaluate microstructure characteristics of the sulfur-doped micro zero-valent zinc reducing agent prepared based on the method S10 for preparing the sulfur-doped micro zero-valent metal reducing agent according to an embodiment of the inventive concept, XRD patterns of the sulfur-doped micro zero-valent zinc reducing agents corresponding to the samples X1, X2, X3, and X4 of Example 1 were identified. The identified XRD patterns are shown in FIG. 4.

Figure 4:
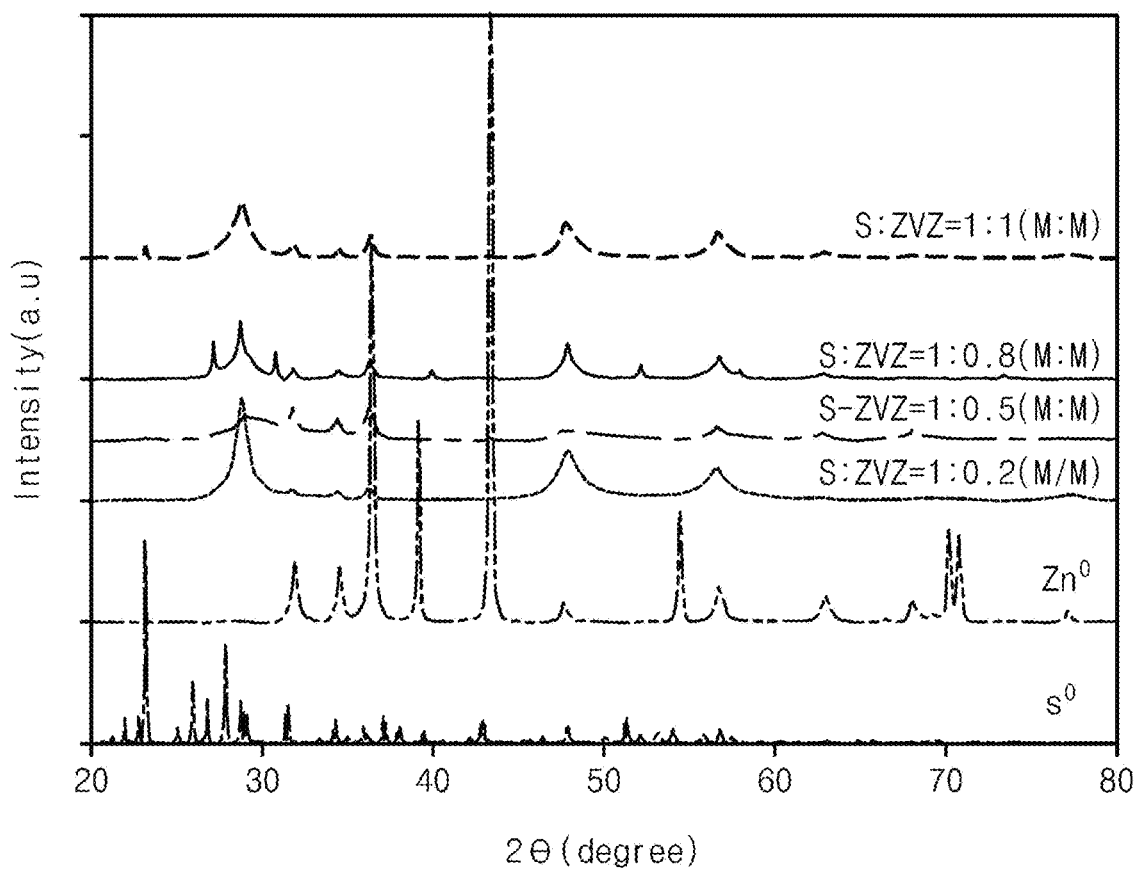
FIG. 4 is a view showing an XRD pattern based on an amount of sulfur mixed in a micro zero-valent zinc reducing agent according to an embodiment of the inventive concept.

In relation, FIG. 4 is a view showing an XRD pattern based on an amount of sulfur mixed in a micro zero-valent zinc reducing agent according to an embodiment of the inventive concept.

Referring to FIG. 4, XRD patterns based on the weight ratio of the micro zero-valent zinc and the sulfur according to an embodiment of the inventive concept are shown. In Experimental example 1, it is identified that typical disordering in which crystalline structures of the micro zero-valent zinc and the sulfur are amorphized occurs after the ball milling process. At the same time, it may be seen that a peak of new zinc sulfide is observed.

That is, it means that the zinc sulfide, the new solid phase, is synthesized by the mechanochemical bonding reaction of the micro zero-valent zinc and the sulfur. Crystallization of the zinc sulfide based on the ball milling process was identified.

In addition, in the ball milling process, the sharpest zinc sulfide peak was observed at the sample X1 in which the weight ratio of the micro zero-valent zinc and the sulfur is 1:0.2. As a sulfur content increases, a weaker and wider zinc sulfide peak was observed.

Accordingly, it may be seen that the zinc sulfide may be synthesized through the mechanochemical reaction based on the method S10 for preparing the sulfur-doped micro zero-valent metal reducing agent according to an embodiment of the inventive concept.

In addition, the sulfur-doped micro zero-valent zinc reducing agent prepared in Example 1 of the inventive concept uses the zero-valent zinc (Zn0), which has a higher oxidation/reduction potential than the zero-valent iron (Fe0), and uses the zinc sulfide (ZnS) formed on the surface of the zero-valent zinc as the electron path, thereby more efficiently reducing residual pollutant such as perfluorooctanoic acid (PFOA), perfluorooctanoic sulfonic acid (PFOS), dioxin, and the like.

Experimental Example 2: Reduction of the Perfluorooctanoic Acid (PFOA)

To identify perfluorooctanoic acid (PFOA) reduction characteristics of the sulfur-doped micro zero-valent metal reducing agent prepared based on the method S10 for preparing the sulfur-doped micro zero-valent metal reducing agent according to an embodiment of the inventive concept, the samples X1 to X4 of Example 1, and Comparative Example 1 were analyzed by being applied to a hydrodynamic cavitation/S-ZVZ/Persulfate process. The analysis result is shown in FIG. 5.

In addition, Comparative Example 1 was applied to both a hydrodynamic cavitation/S-ZVZ process and the hydrodynamic cavitation/S-ZVZ/Persulfate process.

Figure 5:
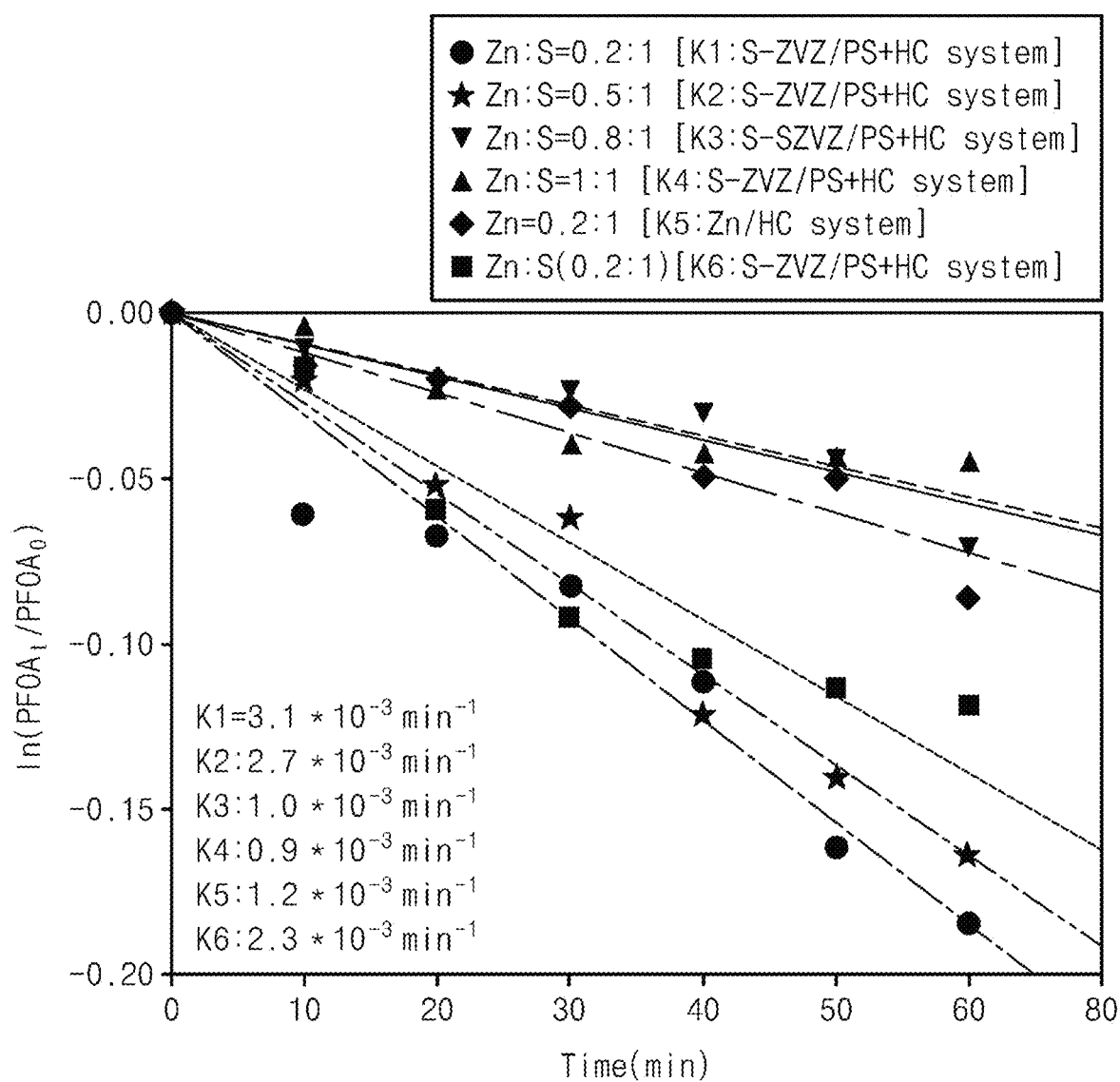
FIG. 5 is a view showing a result of decomposition of PFOA pollutant based on an amount of sulfur mixed in a micro zero-valent zinc reducing agent according to an embodiment of the inventive concept.

In relation, FIG. 5 is a view showing a result of decomposition of PFOA pollutant based on an amount of sulfur mixed in a sulfur-doped micro zero-valent zinc reducing agent according to an embodiment of the inventive concept.

Referring to FIG. 5, PFOA pollutant decomposition results based on the weight ratio of the micro zero-valent zinc and the sulfur according to an embodiment of the inventive concept are shown. Specifically, PFOA oxidation-reduction reaction rate constant values K1 to K4 of the samples X1 to X4 in the hydrodynamic cavitation/S-ZVZ/Persulfate process, a PFOA oxidation-reduction reaction rate constant value K5 of Comparative Example 1 in the hydrodynamic cavitation/S-ZVZ process, and a PFOA oxidation-reduction reaction rate constant value K6 of Comparative Example 1 in the hydrodynamic cavitation/S-ZVZ/Persulfate process may be identified.

In addition, as a result of decomposing the perfluorooctanoic acid (PFOA) pollutant by applying the sulfur-doped micro zero-valent metal reducing agents prepared in Embodiment 1 and Comparative Example 1 to the hydrodynamic cavitation/S-ZVZ/Persulfate process, as shown in FIG. 5, the PFOA oxidation-reduction reaction rate constant value K1 of the sample X1 having the weight ratio of the micro zero-valent zinc and the sulfur of 1:0.2 was $3.1 \times 10^{-3}$ min$^{-1}$, which is the highest.

Accordingly, it may be seen that the sulfur-doped micro zero-valent zinc reducing agent prepared in Example 1 of the inventive concept is effective in the decomposition of the pollutant requiring the reduction-oxidation such as the perfluorooctanoic acid (PFOA).

In addition, the prepared micro zero-valent metal reducing agent may be bonded with hydrogen peroxide or persulphuric acid, which is a general oxidizing agent, to reduce/oxidize a material that is not able to be oxidized with oxidizing agents such as the perfluorooctanoic acid (PFOA), the perfluorooctanoic acid (PFOS), and the dioxin.

In addition, the sulfur-doped micro zero-valent metal reducing agent prepared based on the method for preparing the sulfur-doped micro zero-valent metal reducing agent according to an embodiment of the inventive concept may minimize lowering of a reduction reactivity resulted from the zinc oxide as the zinc sulfide formed on the surface of the zero-valent zinc prevents formation of the zinc oxide on the zero-valent zinc.

The foregoing detailed description illustrates the inventive concept. The foregoing is also illustrative of the preferred embodiments of the inventive concept, and the inventive concept may be used in various other combinations, modifications and environments. That is, the scope and the description of the inventive concept disclosed in this specification may be changed or modified within the scope of equivalents and/or the skill or knowledge of the inventive concept. The embodiments described above are intended to explain certain best modes for implementing the technical idea of the inventive concept. Various modifications required for the specific application and usage of the inventive concept are possible. Therefore, the detailed description of the inventive concept is not intended to limit the inventive concept to the disclosed embodiments. It is also to be understood that the appended claims are intended to cover further embodiments.

The sulfur-doped micro zero-valent metal reducing agent and the method for preparing the same according to the embodiments of the inventive concept may prevent the oxide formation on the surface of the zero-valent metal and improve the reduction efficiency through the ball milling.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A sulfur-doped micro zero-valent metal reducing agent containing a zero-valent metal, wherein a metal sulfide layer synthesized using a ball milling process is formed on a surface of the zero-valent metal,
   wherein
   the zero-valent metal includes zero-valent zinc, and
   the metal sulfide layer includes zinc sulfide.

2. The sulfur-doped micro zero-valent metal reducing agent of claim 1, wherein the metal sulfide layer is synthesized by a mechanochemical bonding reaction, wherein the zero-valent metal in a solid phase and sulfur in the solid phase react to form a new solid phase in the mechanochemical bonding reaction.

3. A method for preparing a sulfur-doped micro zero-valent metal reducing agent, the method comprising:
   in a ball milling process using a ball milling apparatus composed of a jar, balls, and a body,
   a first step of preparing an inorganic mixture by mixing a zero-valent metal and sulfur with each other; and
   a second step of forming a metal sulfide layer synthesized on a surface of the zero-valent metal by putting the inorganic mixture into the jar together with the balls and performing the ball milling,
   wherein
   the zero-valent metal includes zero-valent zinc, and
   the metal sulfide layer includes zinc sulfide.

4. The method of claim 3, wherein the first step includes:
   mixing the micro zero-valent metal with the sulfur in a weight ratio of 1:0.2 to 1.

5. The method of claim 4, wherein the second step includes:
   performing the ball milling process for 2 to 4 hours at a rotation speed of 300 to 500 rpm.

6. The method of claim 5, wherein the second step includes:
   mixing the balls with the inorganic mixture in a weight ratio of 1:5 to 15 in the ball milling process.

* * * * *